(12) United States Patent
Castro et al.

(10) Patent No.: US 10,217,085 B2
(45) Date of Patent: Feb. 26, 2019

(54) METHOD AND APPARATUS FOR DETERMINING SOCIAL NETWORKING RELATIONSHIPS

(75) Inventors: Brenda Castro, Helsinki (FI); James Francis Reilly, Helsinki (FI); Matti Johannes Sillanpää, Helsinki (FI); Toni Peter Strandell, Helsinki (FI); Jyri Kullervo Virtanen, Espoo (FI); Mikko Antero Nurmi, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 1403 days.

(21) Appl. No.: 12/488,949

(22) Filed: Jun. 22, 2009

(65) Prior Publication Data
US 2010/0325218 A1  Dec. 23, 2010

(51) Int. Cl.
G06F 15/16 (2006.01)
G06Q 10/10 (2012.01)
H04L 12/58 (2006.01)
G06Q 50/00 (2012.01)

(52) U.S. Cl.
CPC ............ *G06Q 10/10* (2013.01); *G06Q 50/01* (2013.01); *H04L 51/04* (2013.01)

(58) Field of Classification Search
CPC ............................... H04L 51/04; G06Q 10/10
USPC .................................................. 709/207, 206
See application file for complete search history.

(56) References Cited

U.S. PATENT DOCUMENTS

| | | | |
|---|---|---|---|
| 7,587,070 B2 * | 9/2009 | Myers et al. .............. 382/118 |
| 8,666,198 B2 | 3/2014 | Shochat et al. | |
| 9,210,313 B1 * | 12/2015 | Svendsen ........... H04N 5/23203 |
| 9,235,733 B2 * | 1/2016 | Birdwell ................. G06K 5/00 |
| 2005/0159970 A1 * | 7/2005 | Buyukkokten et al. ......... 705/1 |
| 2006/0048059 A1 * | 3/2006 | Etkin ........................... 715/745 |
| 2006/0143236 A1 | 6/2006 | Wu | |
| 2006/0251339 A1 | 11/2006 | Gokturk et al. | |
| 2008/0040370 A1 * | 2/2008 | Bosworth et al. ............ 707/101 |
| 2008/0077595 A1 | 3/2008 | Leebow | |
| 2008/0091723 A1 * | 4/2008 | Zuckerberg et al. ...... 707/104.1 |
| 2008/0167949 A1 | 7/2008 | Juliano et al. | |

(Continued)

FOREIGN PATENT DOCUMENTS

| WO | WO 2006/098418 A1 | 9/2006 |
| WO | WO 2008/132240 A1 | 11/2008 |
| WO | 2009116049 A2 | 9/2009 |

OTHER PUBLICATIONS

International search report and written opinion for corresponding international application No. PCT/FI2010/050532 dated Dec. 10, 2010, pp. 1-18.

(Continued)

*Primary Examiner* — Karen C Tang
(74) *Attorney, Agent, or Firm* — Ditthavong & Steiner, P.C.

(57) ABSTRACT

An approach is provided for recognizing one or more people from media content and determining if the one or more people are associated with a social networking service. A request is received from a user equipment specifying a media content. Electronically processing of the media content to recognize one or more people is initiated. It is determined whether the one or more people are associated with a member account of a social networking service. A prompting of the user is initiated with an option based on the determination.

20 Claims, 8 Drawing Sheets

(56) References Cited

U.S. PATENT DOCUMENTS

| | | | |
|---|---|---|---|
| 2008/0222295 A1* | 9/2008 | Robinson et al. ............ 709/227 |
| 2008/0270425 A1* | 10/2008 | Cotgreave .................... 707/100 |
| 2008/0307511 A1 | 12/2008 | Ahtisaari |
| 2009/0003662 A1 | 1/2009 | Joseph et al. |
| 2009/0012944 A1* | 1/2009 | Rodriguez ........ G06F 17/30864 |
| 2009/0034805 A1 | 2/2009 | Perlmutter et al. |
| 2009/0046954 A1* | 2/2009 | Ishii ................... G06K 9/00677 |
| | | | 382/312 |
| 2009/0060289 A1 | 3/2009 | Shah et al. |
| 2009/0070852 A1* | 3/2009 | Chijiiwa et al. .................. 726/1 |
| 2009/0074258 A1 | 3/2009 | Cotgreave |
| 2009/0102859 A1* | 4/2009 | Athsani ................... G06F 3/011 |
| | | | 345/619 |
| 2009/0141950 A1 | 6/2009 | Ryu |
| 2009/0187624 A1 | 7/2009 | Brownholtz et al. |
| 2009/0210377 A1* | 8/2009 | Gruen ...................... G06N 5/02 |
| | | | 706/50 |
| 2009/0319270 A1* | 12/2009 | Gross ...................... G10L 17/26 |
| | | | 704/246 |
| 2010/0036875 A1* | 2/2010 | Miezianko ......... G06K 9/00295 |
| | | | 707/737 |
| 2010/0046842 A1* | 2/2010 | Conwell .......... G06F 17/30265 |
| | | | 382/218 |
| 2010/0050090 A1* | 2/2010 | Leebow .................. G06F 3/048 |
| | | | 715/751 |
| 2010/0082684 A1* | 4/2010 | Churchill .......... G06F 17/30867 |
| | | | 707/784 |
| 2010/0092095 A1* | 4/2010 | King ................... G06F 17/3061 |
| | | | 382/229 |
| 2010/0103277 A1* | 4/2010 | Leebow ..................... 348/222.1 |
| 2010/0115114 A1* | 5/2010 | Headley ................. G06F 21/32 |
| | | | 709/229 |
| 2010/0169343 A1* | 7/2010 | Kenedy ............. G06F 17/30867 |
| | | | 707/758 |
| 2010/0211535 A1* | 8/2010 | Rosenberger ..... G06F 17/30038 |
| | | | 706/20 |
| 2011/0182485 A1* | 7/2011 | Shochat ............. G06K 9/00221 |
| | | | 382/118 |
| 2011/0276689 A1* | 11/2011 | Rosen ................. G06F 17/3087 |
| | | | 709/224 |
| 2013/0229482 A1* | 9/2013 | Vilcovsky ............... H04N 7/144 |
| | | | 348/14.07 |
| 2013/0262588 A1 | 10/2013 | Barak et al. |
| 2017/0220601 A1* | 8/2017 | Barak ............... G06F 17/30194 |
| 2017/0236407 A1* | 8/2017 | Rhoads ................. G08C 17/02 |
| | | | 455/420 |

OTHER PUBLICATIONS

Extended European Search Report for corresponding European Application No. 10791681.9, dated Nov. 18, 2014, 6 pages.

Chinese Office Action with English language summary for corresponding Patent Application No. 201080036726.0 dated Nov. 19, 2013, 10 pages.

Office Action with English Summary for Chinese Patent Application No. 201080036726.0, dated Mar. 20, 2013, pp. 1-41.

Chinese Office Action for corresponding Chinese Application No. 201080036726.0, dated Jul. 17, 2014, with English-language summary, 11 pages.

U.S. Appl. No. 61/070,377, filed Mar. 20, 2008, 11 pages.

Office Action for corresponding European Patent Application No. 10 791 681.9-1217, dated Apr. 13, 2018, 9 pages.

Office Action for corresponding Indian Patent Application No. 665/CHENP/2012, dated Jul. 27, 2018, 6 pages.

* cited by examiner

METHOD AND APPARATUS FOR DETERMINING SOCIAL NETWORKING RELATIONSHIPS

BACKGROUND

Service providers and device manufacturers are continually challenged to deliver value and convenience to consumers by, for example, providing compelling network services. Important differentiators in the industry are social networking applications and services. In particular, adding a person to a social network generally utilizes an exchange of a username or an e-mail address. Remembering such information may be difficult and may be forgotten before the person is added to the social network of a user.

SOME EXAMPLE EMBODIMENTS

Therefore, there is a need for an approach for creating social networking relationships based on media content, such as an image.

According to one embodiment, a method comprises receiving a request, from a user equipment, specifying a media content. The method also comprises initiating electronically processing of the media content to recognize one or more people. The method further comprises determining whether the one or more people are associated with a member account of a social networking service. The method additionally comprises initiating presentation of an option to the user equipment based on the determination.

According to another embodiment, an apparatus comprising at least one processor, and at least one memory including computer program code, the at least one memory and the computer program code configured to, with the at least one processor, cause the apparatus to receive a request from, a user equipment, specifying a media content. The apparatus is also caused to initiate electronically processing of the media content to recognize one or more people. The apparatus is further caused to determine whether the one or more people are associated with a member account of a social networking service. The apparatus is additionally caused to initiate presentation of an option to the user equipment based on the determination.

According to another embodiment, a computer-readable storage medium carrying one or more sequences of one or more instructions which, when executed by one or more processors, cause an apparatus to receive a request, from a user equipment, specifying a media content. The apparatus is also caused to initiate electronically processing of the media content to recognize one or more people. The apparatus is further caused to determine whether the one or more people are associated with a member account of a social networking service. The apparatus is additionally caused to initiate presentation of an option to the user equipment based on the determination.

According to another embodiment, an apparatus comprises means for receiving a request, from a user equipment, specifying a media content. The apparatus also comprises means for initiating electronically processing of the media content to recognize one or more people. The apparatus further comprises means for determining whether the one or more people are associated with a member account of a social networking service. The apparatus additionally comprises means for initiating presentation of an option to the user equipment based on the determination.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

A method and apparatus for determining social networking relationships based on media content are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
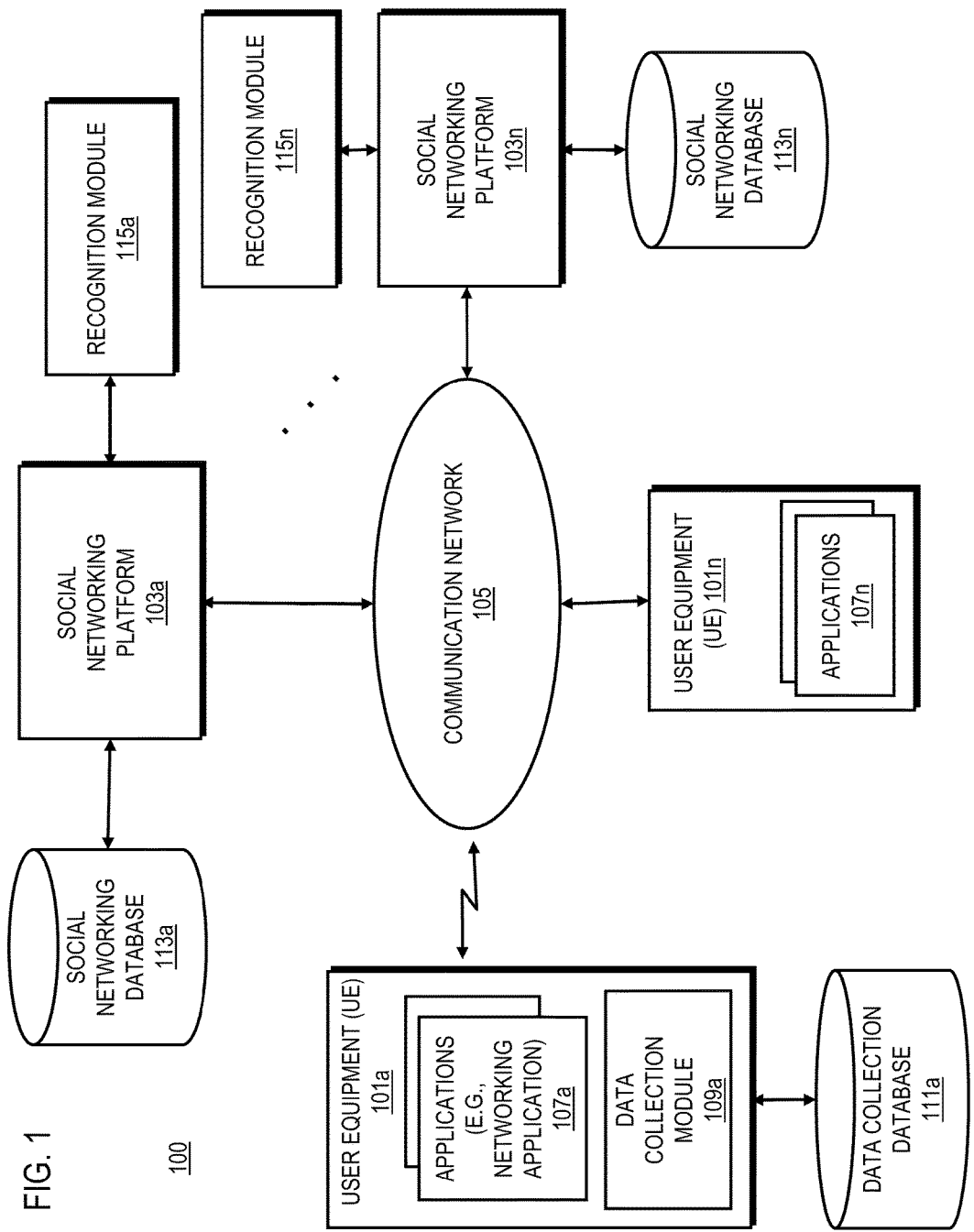
FIG. 1 is a diagram of a system capable of identifying social networking relationships based on media content, according to one embodiment.

FIG. 1 is a diagram of a system capable of creating social networking relationships based on media content, according to one embodiment. With today's social networking services, it is increasingly desirable to add people to a user's network. These people can be employers, colleagues, friends, acquaintances, or person that a user might meet. Adding a person to a user's network involves the exchange of some personal information (e.g., an e-mail address, a username, address, name, etc.). Additionally adding a person to a user's network can involve logging into a service and sending a social network invitation. This can be difficult to accomplish when a user meets a person on the street, or forgets a portion of personal information given, or is unable to attain the requisite personal information.

To address this problem, a system 100 of FIG. 1 introduces the capability to create social networking relationships based on media content. Media content (e.g., a digital image, a video, audio, an iris scan, a finger print, etc.) can be used to invite a person to a user's social network. Under the scenario of FIG. 1, a system 100 involves user equipment (UE) 101*a*-101*n* having connectivity to a social networking platform 103*a*-103*n* over a communication network 105.

The UE 101 can utilize a social networking application 107a to receive services from the social networking platform 103a. The UE 101 can also have a data collection module 109a to collect media content and a data collection database 111a to store the media content. The media content can be transmitted to the social networking platform 103. The social networking platform 103 can store the media content in a social networking database 113a-113n. The social networking platform 103 can also process the media content via a recognition module 115a-115n to recognize that a person is captured in the media content by extrapolating biometric data associated with the person by using a recognition module. This biometric data can then be stored in the social networking database 113. In one embodiment, the biometric data can be stored separate from the media content to efficiently use space by not storing the media content.

In one embodiment, a social network member account can have a user profile with an image or other associated media content. This media content is thus associated with the member and can also be extrapolated utilizing a recognition module for biometric data and stored in the social networking database 113. In another embodiment, a user can transmit the media content to obtain social networking options relating to the media content. Social networking options can include automatically adding a person to the user's social network that matches the biometric data, displaying a matching member selection list of members that match sufficiently to a biometric data in the media content, adding the biometric data to an invitation queue when no member profile has matching biometric data, etc.

In some embodiments, multiple people's biometric data are extrapolated and can be matched. In these embodiments, options can be provided that allow for cross-invitations between the people. If a person's biometric data does not match a member account, the biometric data can be stored in the social networking database 113 and in a queue if a member account (e.g., a current account with a new profile or a new account) later matches the biometric data. In one embodiment, when a new account is created, the social networking database 113 is queried to determine if there are pending friend requests for the new account holder. In another embodiment, when a member profile is updated, the social networking database 113 is queried for pending friend requests. In one embodiment, the query to the social networking database 113 involves extrapolating biometric data via a recognition module 115 from media content of a new account or profile and matching the biometric data with stored biometric data associated with an invitation request.

In one embodiment, the system 100 includes a recognition module 115. A recognition module 115 can extrapolate biometric data from media content to recognize identifying information of a person. In one embodiment, the recognition module 115 can also be used to compare two sets of biometric data to determine if the two sets match within a certain error threshold. In one embodiment, the media content can include an image, a video, a fingerprint, a brainwave signature, a deoxyribonucleic acid (DNA) pattern, or an iris scan. In one embodiment, the recognition module 115 can determine if an image (e.g., a digital image, a three-dimensional image, an infrared image, etc.) includes a person that can be recognized. An image can be scanned to determine selected facial features from the image. The facial features can then be compared to facial features stored in a database. In some embodiments, the recognition module 115 can determine if the image is of a real person or a cartoon, for instance based on three-dimensional visual cues in the picture. By making sure a picture isn't taken of a picture instead of a real person (and if necessary, also by asking for reinforcing biometric data), impersonating e.g. a celebrity is prevented. Two images of a person can be matched if the features match within a certain probability. Similar techniques can be used for still images of a video, fingerprint images, and iris images. Additionally, voice and other sound recognition techniques can similarly be used by extrapolating biometric data from the media and comparing two sets of biometric data.

In one embodiment, the system 100 includes a social networking database 113. In another embodiment, the social networking database 113 includes member account information. Member account information can include media content, profiles, relationship data, and other such social networking information. Additionally, the social networking database 113 can include biometric data of account holders. In one embodiment, the biometric data can be extrapolated from media content using a recognition module 115. In another embodiment, the biometric data is associated with an account. In yet another embodiment, the biometric data is associated with unknown users. In this embodiment, new users or users with updated profiles can be associated with the biometric data at a later time. Additionally, the biometric data of unknown users can be associated with an invitation list of a member account.

As shown in FIG. 1, the system 100 comprises a user equipment (UE) 101 having connectivity to social networking platforms 103 via a communication network 105. By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, mobile ad-hoc network (MANET), and the like.

The UE 101 is any type of mobile terminal, fixed terminal, or portable terminal including a mobile handset, station, unit, device, multimedia tablet, Internet node, communicator, desktop computer, laptop computer, Personal Digital Assistants (PDAs), or any combination thereof. It is also contemplated that the UE 101 can support any type of interface to the user (such as "wearable" circuitry, etc.).

By way of example, the UE 101 and a social networking platform 103 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

Figure 2:
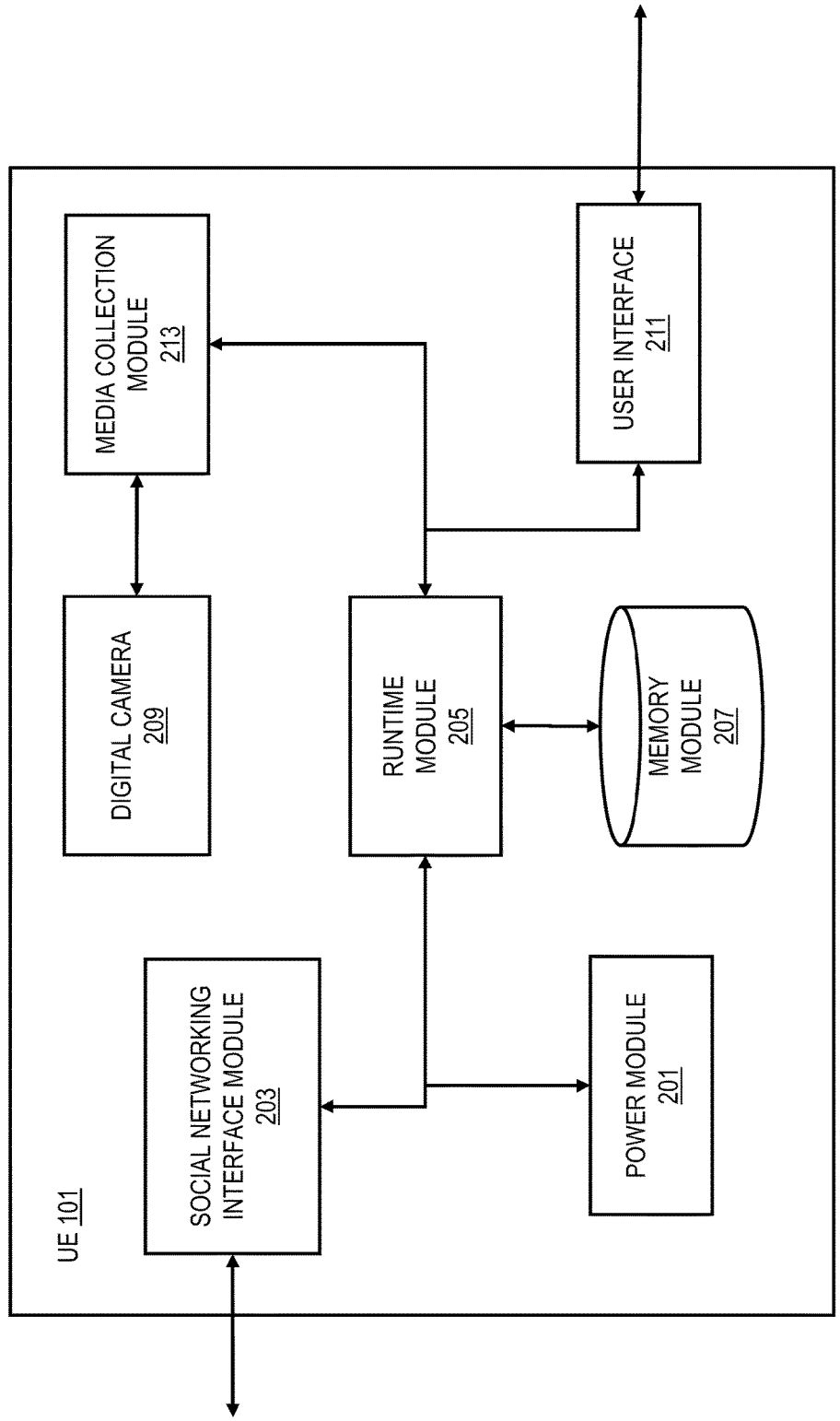
FIG. 2 is a diagram of the components of a user equipment used in a system for creating social networking relationships based on media content, according to one embodiment.

FIG. 2 is a diagram of the components of a user equipment 101 used in a system 100 for creating social networking relationships based on media content, according to one embodiment. By way of example, the UE 101 includes one or more components for utilizing the features of a social networking platform 103. It is contemplated that the functions of these components may be combined in one or more components or performed by other components of equivalent functionality. In this embodiment, the UE 101 includes a power module 201, a social networking interface module 203, a runtime module 205, a memory module 207, a digital camera 209, a user interface 211, and a media collection module 213.

The power module 201 provides power to the UE 101. The power module 201 can include any type of power source (e.g., battery, plug-in, etc.). Additionally, the power module can provide power to the components of the UE 101 including processors, memory, and transmitters.

In one embodiment, the UE 101 includes a social networking interface module 203. The social networking interface module 203 is used by a runtime module 205 to request and receive services from the social networking platform 103. These services can utilize collecting, processing, and comparing biometric data to provide service options for the UE 101. The social networking interface module 203 can use multiple communications technologies to communicate with a social networking platform 103. For example, the application interface module 203 can interface with the social networking platform 103 using a wireless local area network (WLAN), or a cellular network.

In another embodiment, a media collection module 213 is utilized by a runtime module 205 to collect media content. The media collection module 213 can gather media content via a digital camera 209, a microphone, a fingerprint scanner, or any other media input mechanism (e.g., the internet). The runtime module 205 can store the media content in a memory module 207 and transmit the media content to a social networking platform 103 via a social networking interface module 203. In one embodiment, the media content can be displayed to a user via a user interface 211.

In one embodiment, the UE 101 can utilize a social networking platform 103 for updating the user's account information. In one embodiment, the user takes an image of the user via a digital camera 209. The user then uploads the image to the social networking platform 103 via the social networking interface module 203. The image can be used as a profile image for a user account of the user. Profile images can be processed through a recognition module 115 to gather biometric data from the image. The biometric data can then be stored in a social networking database 113 and associated with the user's member account. Previous profile image biometric data can also be stored and associated with the user's member account. In this manner, a robust amount of biometric data can be used for further processing and comparisons. In one embodiment, an image can be digitally signed, watermarked, or encrypted to mark (e.g., marked with a "befriending by image application" tag) an increased chance that the image contains biometric data about a member. In one embodiment, multiple sets of biometric data are used to filter inconsistent biometric data (e.g., filter out biometric data of a second person in an image unassociated with the member account or filter out a cartoon image). The recognition module 115 can be used to associate biometric data of people with member accounts and create relationships using this information.

In one embodiment, a user can utilize a social networking platform 103 for adding people to the user's social network via biometric data. In one embodiment, adding a person to the user's social network could involve sending a friend invitation or sending a colleague invitation to another member account. In this embodiment, biometric data is collected from media content associated with a member profile on member accounts and stored in a social networking database 113. The user captures media content using a media capture device. The user then sends the media content to a social networking platform 103 with a request for services associated with matching biometric data within the media content to biometric data associated with member profiles. In one embodiment, matching biometric data can be used to send the matched member an invitation to the user's social network. In another embodiment, matched members can be displayed to the user, allowing the user to choose to invite the matched member to the user's social network. This is helpful when multiple people have very similar biometric data (e.g., twins) or if multiple users use a similar profile image (e.g., if multiple people are in the profile picture). In another embodiment, multiple matched people from biometric data can be invited at one time.

In another embodiment, the user is given the option to add the media content to the user's account storage with annotations. In this embodiment, the accounts matched to the biometric data of the user can be automatically associated with the media content. In one embodiment, the media content can be displayed as being associated with the matched member. In another embodiment, an image can have an annotation (e.g., first name, last name, city, etc.) of the associated member. In one embodiment, any data from the matched member's public profile can be used in the annotation (e.g., list of service memberships of the member, the number or list of common friends, the number of pending messages sent to or received from the member, other news, updated information, or the like). In some embodiments, for security and privacy, only limited information is displayed. Thus, in some embodiments, the displayed content is limited to the information the user can access. An uploaded image can have automatic annotations of recognized people added to the image using the limited content. In some embodiments, the biometric data associated with the media content do not match a member of the social network. In this embodiment, the annotation can indicate that the person is not a member. In another embodiment, the annotations can include relationships between people associated with the media content.

In one embodiment, persons associated with biometric data that are not members of the service can be invited to join the social network. In this embodiment, the user is provided the option to invite the person associated with biometric data (e.g., facial recognition of an image) in the media content (e.g., an image) to the social network. Multiple people within the image can be invited at the same time. In one embodiment, the user can add the associated people's contact information (e.g., an e-mail address, text message, a phone number, etc.) and invite the people to the service. In another embodiment, the user does not enter the associated people's contact information. In this embodiment, an associated person's biometric data is saved to a list of social networking invitations of the user. This list is associated with biometric data so that if a member is matched with the biometric data in the future, the member can be invited to the user's social network. In this scenario, the member can be a new member or an existing member with new biometric data associated with the member's account.

In one embodiment, a user can select multiple people to invite using collected biometric data. In this embodiment, the user takes an image of a group of people and sends the image to a social networking platform 103 for processing. The social networking platform 103 recognizes the people in the image by extrapolating biometric data. Some of the people in the image are matched to user accounts using the biometric data while others are not. The people can be identified using annotations displayed on a user interface 211. In one embodiment, the group of people can be invited to join the user's social network at the same time. Each of the people in the image can also be selected for recommended invitations to the other people in the image. These people can be represented as a group. In one embodiment, biometric data or any identifying data (e.g., a Bluetooth address of a UE 101, a contact card associated with a UE 101, etc.) can be used to initiate the invitation requests to the group of people. Thus, each person in the image can have an invitation request sent to the other people in the group. If the person is not a member of the social network, the user can invite the person to the service using contact information.

According to one embodiment, when an invited person creates an account, the group of people can be preselected as friends for the individual. In another embodiment, the group of people can be recommended to the person when the account is created. In yet another embodiment, contact information about the group of people can be filtered against a contact information database stored in a memory 207 of a UE 101 that the invited person is using. If the contact information of one of the people in the group matches an entry in the contact information database, the person can be selected as a real life friend. In one embodiment, real life friends are automatically asked to join the invited person's network. In another embodiment, if a first person in the group accepts and a second person does not, the second person can be sent a notification (e.g., James just joined from Toni's invitation to the social network, why don't you join the party?) of the joining of the first person to coax the second person into joining. In one embodiment, a user invited to the service can be sent a personal Uniform Resource Locator (URL) with information about the group of people. Under this scenario, the URL webpage can have information about the people in the group (e.g., the people's profiles, status, etc.) and can display some of the features of the social networking service. Additionally, the URL can allow for the registration of the invited user. In one embodiment, because some form of personal user contact information (e.g., address, e-mail address, phone number, or other identifying token) was used to invite the invited user and a unique random token known only to the service and to the recipient (that proves the recipient has access to read this message thus verifying the contact information) is included in the URL, all that is needed for registration is a password. The invited user's profile can be later created.

In one embodiment, presentation options for a media content can be linked using biometric data extrapolated from media content and stored in a social networking database 113. In this embodiment, a social networking platform 103 can automatically recognize friends in the media content and tag the friends with information. This information can include the name, location, and other profile information of the friend. In another embodiment, the media content can be ordered in a series to show relevant social relationships between people within an image. Viewers of the media content can perform interactions using this information (e.g., add a friend). In other embodiments, extrapolated biometric data can be integrated with other services (e.g., image sharing application).

Figure 3:
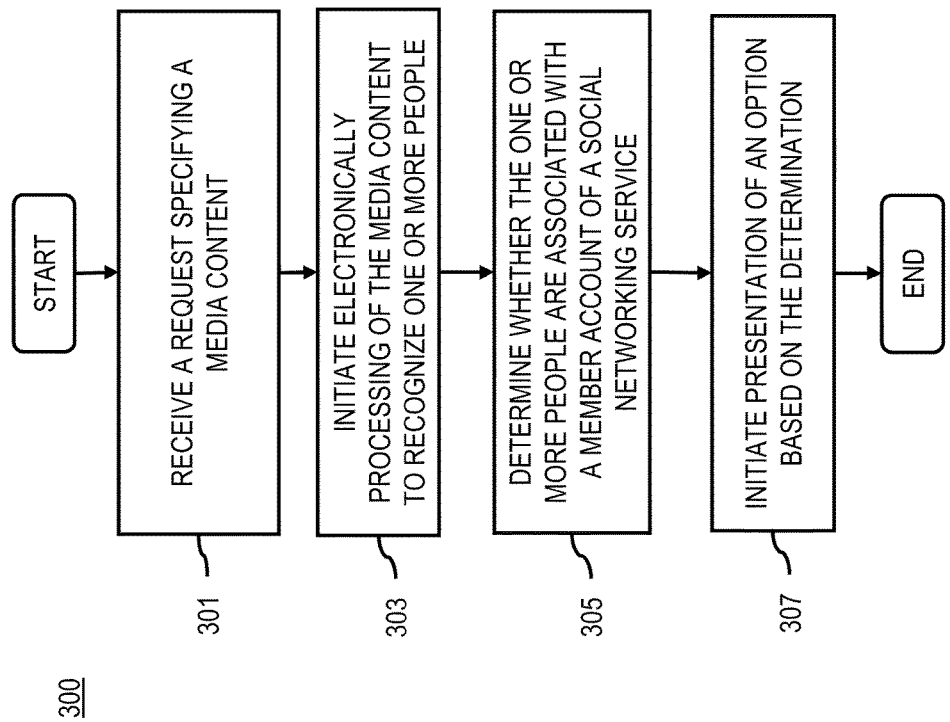
FIG. 3 is a flowchart of processes for creating social networking relationships based on media content, according to one embodiment.
Figure 4B:
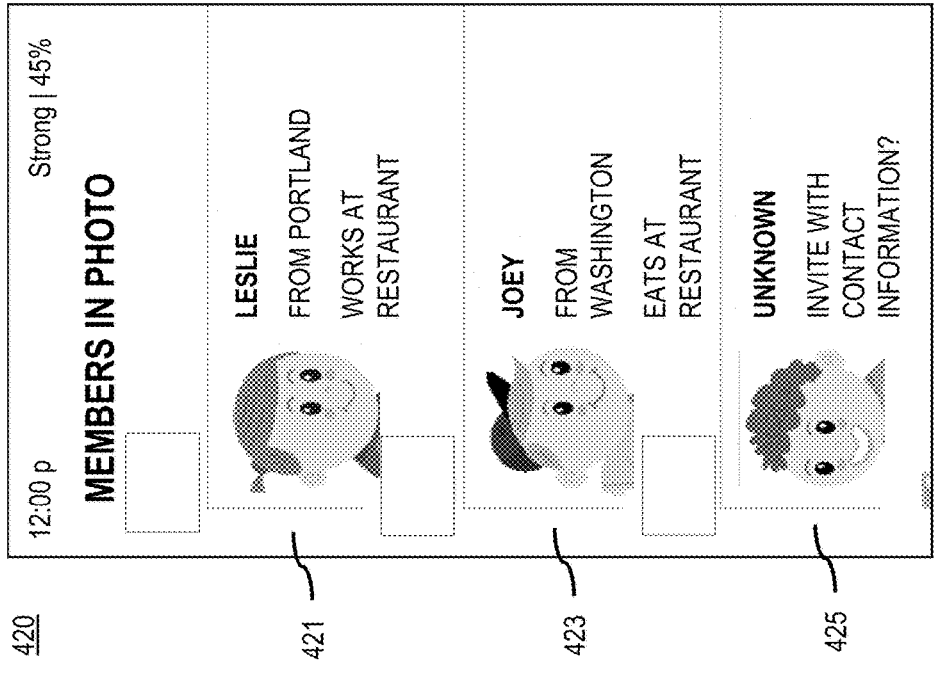
FIGS. 4A-4D are diagrams of user interfaces utilized in the processes of FIG. 3, according to various embodiments.
Figure 4A:
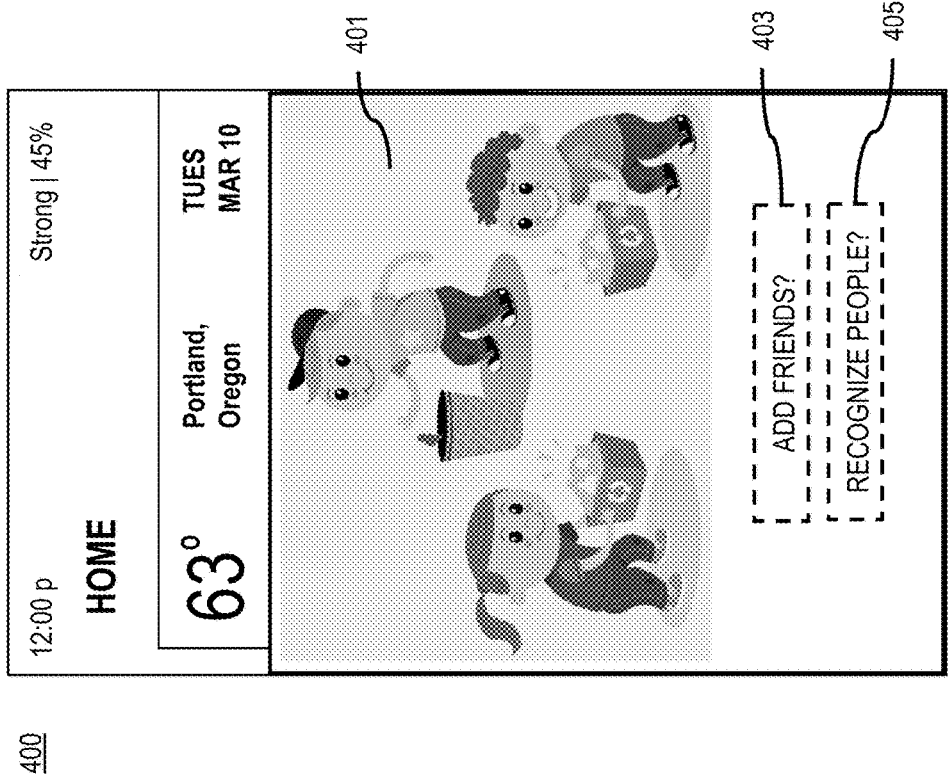
Figure 4C:
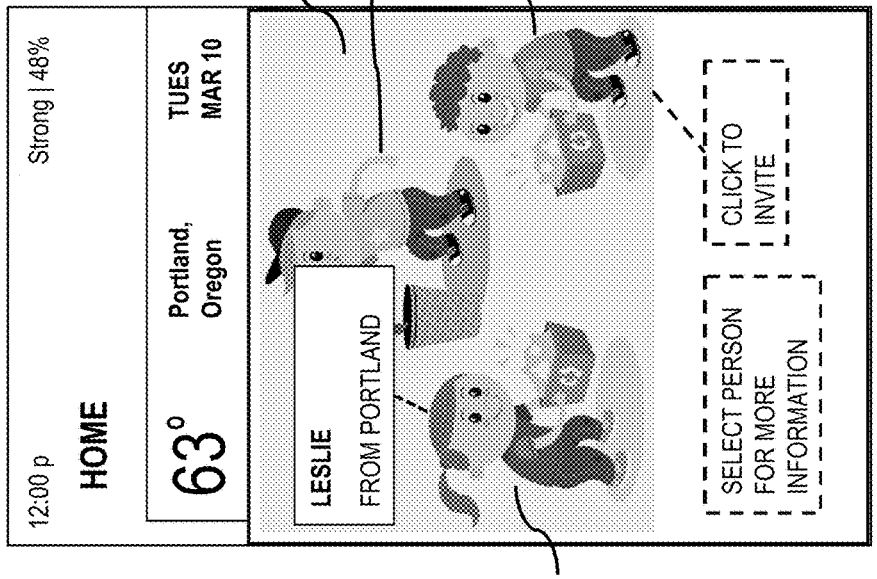
Figure 4D:
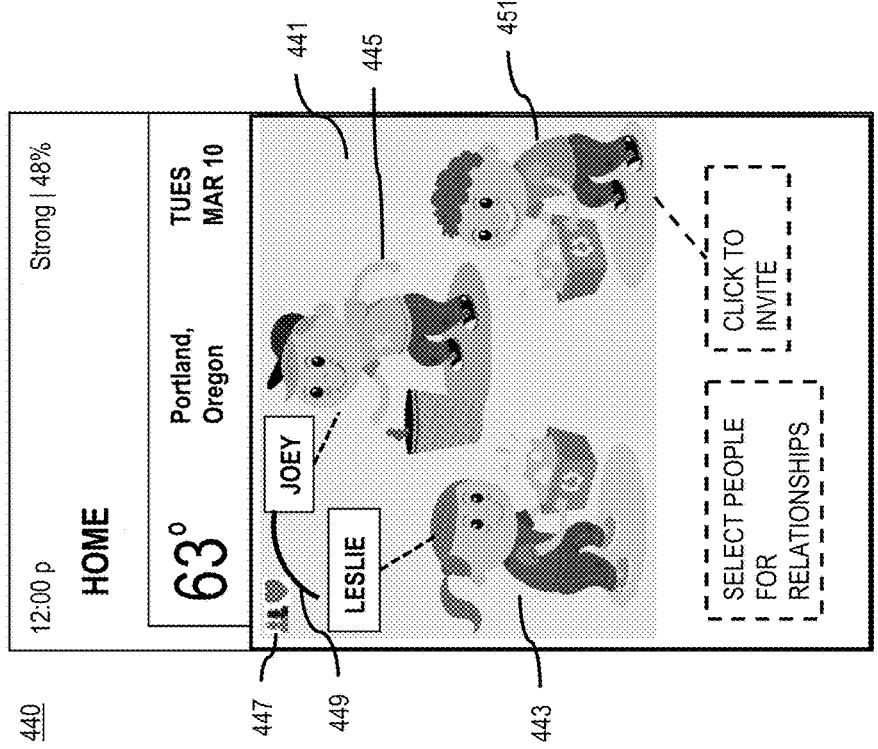

FIG. 3 is a flowchart of a process for creating social networking relationships based on media content, according to one embodiment. In one embodiment, the social networking platform 103 performs the process 300 and is implemented in, for instance, a chip set including a processor and a memory as shown FIG. 6. A UE 101 collects media content using a media collection module 213. In some embodiments, the media content is collected using a digital camera, in other embodiments; the media is collected from an outside source (e.g., the internet). The media content can include biometric data of one or more people embedded in the media content. The UE 101 sends the media content to a social networking platform 103 via a social networking interface module 203 along with a request to perform an operation. One such request would be a request to recognize people in the media content and add each person in the media content to user of the UE's social network.

In step 301, the social networking platform 103 associated with a social networking service receives a request specifying a media content. In one embodiment, the request is specified by a UE 101. The media content can include a digital image, a video, a sound, a fingerprint image, a combination thereof, or other content that can include biometric data. In this embodiment, biometric data uniquely recognizes humans based upon one or more intrinsic physical trait.

In step 303, the social networking platform 103 initiates electronic processing of the media content to recognize one or more people via a recognition module 115. In this embodiment, the recognized people are represented by biometric data. Common facial recognition, fingerprint recognition, iris recognition, voice recognition, or other recognition algorithms can be used to identify a person. In one embodiment, this information is stored in a social networking database 113. In another embodiment, this information is associated with a user account (e.g., a profile image).

At step 305, the social networking platform 103 determines whether the one or more recognized people are associated with a member account of the social networking service by comparing biometric data of the media content with biometric data associated with the member account. In this embodiment, the member account has a profile and a profile media content associated with that profile. The member account also has biometric data associated with the profile media content stored in a database. The collected biometric data is compared to the profile biometric data of a set (e.g., all friends of friends, all users within six degrees of separation, all users, etc.) of member accounts. If there is a match between a person associated with the media content and a member account, an option is generated for the UE 101 regarding that match. If there is not a match, a separate option is generated. If there some of the recognized people are matched and others are not, another option is generated.

At step 307, the social networking platform 103 initiates presentation of an option to the UE 101 based on the determination. In one embodiment, if there is a match between a person associated with the media content and the member account, the social networking platform 103 generates and sends a presentation of the member account to the UE 101. An option from the presentation can be selected on the UE 101. In one embodiment, the option includes sending an invitation to join a social network of a user of the UE 101. In another embodiment, the presentation includes more than one member account that matched the biometric data. Thus, the UE 101 can select the correct member account to invite. In one embodiment, if one or more people are unassociated with a member account, the biometric data extrapolated from the media content is stored in a social networking database 113. Additionally, this biometric data can be associated with a social invitation queue. In this embodiment, if a member account is subsequently associated with the biometric data, the member account is invited to the user's social network. A member account can be associated with the biometric data if the member account adds a new media content that when processed using recognition algorithms matches the stored biometric data of one of the recognized people. In one embodiment, some of the recognized people are matched to an account and others are not. In this embodiment, the matched people can be sent invitations and the unmatched people's biometric data can be stored in an invitation queue. In one embodiment, multiple people can be sent invitations based on the media content. In another embodiment, the social networking platform 103 initiates sending of invitations from one of the recognized people to each of other ones of the recognized people. In this embodiment, the user is sent a prompt to add additional information about any recognized people that do not match a member account. The social networking platform 103 receives input from the UE 101 regarding the additional information and sends the invitation to join the social networking service to the unmatched people. In this embodiment, if one of the unmatched people join the social networking service, the other people can be sent a notification of the person joining the service to encourage the other people to join.

With the above approach, users can take advantage of determining social networking relationships using media content (e.g., an image, a video, a sound, etc). In this manner, the user is able to select an option to have a social networking platform 103 recognize people associated with the media content by extrapolating biometric data from the media content and comparing it to other saved biometric data. Thus, a user can take a picture of a friend or colleague and add the friend or colleague to a social network using a social networking application. Additionally, an image can be used to quickly and conveniently add multiple people to the user's social network with little effort by the user. Also, according to the above approach, the people in the photograph can be cross-invited with little effort from the user or the people.

FIGS. 4A-4D are diagrams of user interfaces utilized in the processes of FIG. 3, according to various embodiments. Interface 400 displays media content captured as an image 401 and is presented on a UE 101. In one embodiment, the UE 101 is touch screen; in another embodiment, the UE 101 input is a keypad or a scroll and click mechanism. A user is provided options to add the people in the image as friends 403 or recognize the people 405. In one embodiment, the user has met the people, but does not remember the name of the person. In another embodiment, the user selects to add each of the people as friends. The UE 101 utilizes a social networking platform 103 to recognize the people in the image 401 using biometric information (e.g., face recognition of an image), determine if the people have member accounts, and invite the people to the user's social network. If the people are not matched to member accounts, the people are added to an invitation list that includes the corresponding biometric information. If a member account is later associated with the biometric information, the member account is automatically invited to the user's social network. In another embodiment, the user is notified about the associated member account instead of automatically inviting the member account.

Interface 420 displays information returned if the user utilizes the recognize people 405 option, according to one embodiment. In this embodiment, the user interface 420 displays that two of the people 421, 423 in the image 401 were recognized and match a member account. The user interface 420 provides additional data about the member accounts. In one embodiment, to invite the people to the user's social network, the user can click on the member. Thus, in one embodiment, a user is able to add a new connection by tapping the person's face on a touch screen to add new connections. In another embodiment, one of the people 425 in the image 401 is recognized, but does not match a member account. In this embodiment, the user is prompted to add additional information about the unknown person 415 to invite the unknown person 415 to the social networking service. In one embodiment, the user can choose to add the contact information and invite the user. In another embodiment, the user can choose to add the user to a future invitation list. In this scenario, if biometric data is later associated with the unknown person 425, the unknown person 425 is automatically invited.

Interface 440 displays information returned if the user utilized the recognize people option 405, according to another embodiment. In this embodiment, the user interface 420 displays an annotated image 441 with options. In another embodiment, the user interface 420 can display a video (not shown). The user is able to see more information about a person in the image 441 by clicking or hovering over the person 443. In this embodiment, Leslie 443 is recognized. In one embodiment, Leslie's relationships (e.g., colleague, significant other, friend, stranger, etc.) with another person 445 can be shown by clicking on the other person 445. In this embodiment, the other person is determined to be Joey and the relationship status 447 shows that Joey and Leslie are friends and significant others. The relationship information can be displayed as an embedded or additional layer on the image or a viewfinder. In another embodiment, a relationship descriptor 449 can optionally change in nature depending on a determined relative strength of the relationship (e.g., the thickness of the line varies). One process to determine the strength is by probing social networking profiles for the information. In one embodiment, the social networking profiles indicate the strength of the relationship. In another embodiment, messages between the identified people can be scanned, tracked, or recognized to determine the relative strength of the friendship. Relationship information can also be added using this approach. Thus, a user is able to add a relationship between two people in the user's network. This information can then be sent to a social networking platform 103 and stored in a social networking database 113 for later use. In another embodiment, a recognized person 451 that is not associated with a member account can be invited to the user's social network.

Interface 460 displays additional information returned if the user utilized the recognize people option 405, according to one embodiment. In this embodiment, the user interface 460 displays an annotated image 461 that allows a user to select a recognized person in the image for more information about the recognized person. The user is able to view more information about a person in the image 461 by clicking or hovering over the person 463. In this embodiment, the image 461 shows profile data of Leslie 463, a social networking service member that is also in the social network of the user. In this embodiment, Leslie 463 is from Portland. In one embodiment, the social networking service can be Facebook®, Linkedin®, or Twitter®. In another embodiment, other persons 465, 467 in the image are recognized, but not members. In one embodiment, the user meets a nice person, Leslie 463, but cannot remember her name. However, the user has an image 461 including Leslie 463. Thus, the user is able to select the unknown person (Leslie 463) in the image 461. In one embodiment, multiple social networking services can be used to identify the unknown person. In another embodiment, multiple service members are matched based on facial recognition and comparisons to profile pictures to the selected image of Leslie 463. In this embodiment, the user is offered displayed (not shown) the multiple matching service members and information about each one. Thus, the user can choose the right recognized person to be the user's friend.

The processes described herein for determining social networking relationships based on media content may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof Such exemplary hardware for performing the described functions is detailed below.

Figure 5:
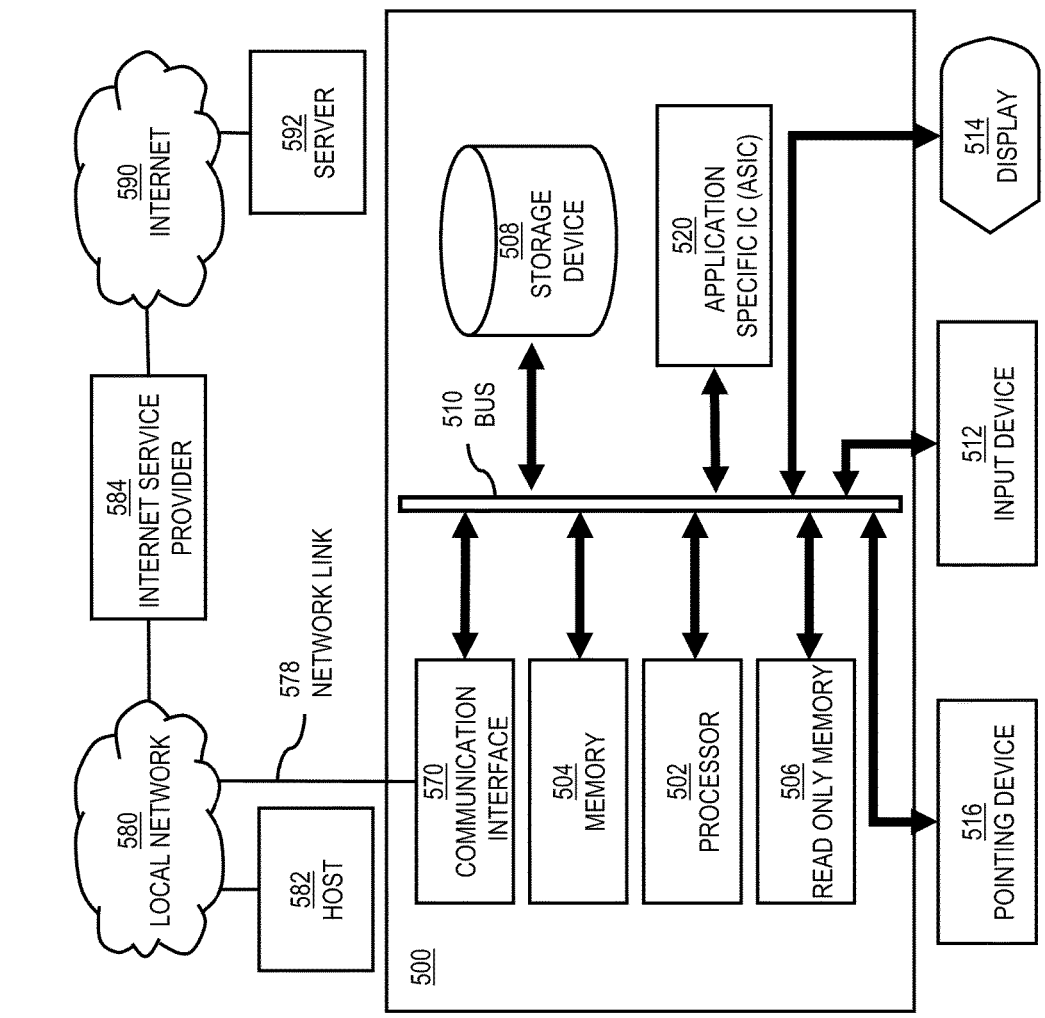
FIG. 5 is a diagram of hardware that can be used to implement an embodiment of the invention.

FIG. 5 illustrates a computer system 500 upon which an embodiment of the invention may be implemented. Computer system 500 is programmed (e.g., via computer program code or instructions) to determine social networking relationships based on media content as described herein and includes a communication mechanism such as a bus 510 for passing information between other internal and external components of the computer system 500. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 510 includes one or more parallel conductors of information so that information is transferred quickly among devices coupled to the bus 510. One or more processors 502 for processing information are coupled with the bus 510.

A processor 502 performs a set of operations on information as specified by computer program code related to determining social networking relationships based on media content. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 510 and placing information on the bus 510. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 502, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 500 also includes a memory 504 coupled to bus 510. The memory 504, such as a random access memory (RAM) or other dynamic storage device, stores information including processor instructions for determining social networking relationships based on media content. Dynamic memory allows information stored therein to be changed by the computer system 500. RAM allows a unit of information stored at a location called a memory address to be stored and retrieved independently of information at neighboring addresses. The memory 504 is also used by the processor 502 to store temporary values during execution of processor instructions. The computer system 500 also includes a read only memory (ROM) 506 or other static storage device coupled to the bus 510 for storing static information, including instructions, that is not changed by the computer system 500. Some memory is composed of volatile storage that loses the information stored thereon when power is lost. Also coupled to bus 510 is a non-volatile (persistent) storage device 508, such as a magnetic disk, optical disk or flash card, for storing information, including instructions, that persists even when the computer system 500 is turned off or otherwise loses power.

Information, including instructions for determining social networking relationships based on media content, is provided to the bus 510 for use by the processor from an external input device 512, such as a keyboard containing alphanumeric keys operated by a human user, or a sensor. A sensor detects conditions in its vicinity and transforms those detections into physical expression compatible with the measurable phenomenon used to represent information in computer system 500. Other external devices coupled to bus 510, used primarily for interacting with humans, include a display device 514, such as a cathode ray tube (CRT) or a liquid crystal display (LCD), or plasma screen or printer for presenting text or images, and a pointing device 516, such as a mouse or a trackball or cursor direction keys, or motion sensor, for controlling a position of a small cursor image presented on the display 514 and issuing commands associated with graphical elements presented on the display 514. In some embodiments, for example, in embodiments in which the computer system 500 performs all functions automatically without human input, one or more of external input device 512, display device 514 and pointing device 516 is omitted.

In the illustrated embodiment, special purpose hardware, such as an application specific integrated circuit (ASIC) 520, is coupled to bus 510. The special purpose hardware is configured to perform operations not performed by processor 502 quickly enough for special purposes. Examples of application specific ICs include graphics accelerator cards for generating images for display 514, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 500 also includes one or more instances of a communications interface 570 coupled to bus 510. Communication interface 570 provides a one-way or two-way communication coupling to a variety of external devices that operate with their own processors, such as printers, scanners and external disks. In general the coupling is with a network link 578 that is connected to a local network 580 to which a variety of external devices with their own processors are connected. For example, communication interface 570 may be a parallel port or a serial port or a universal serial bus (USB) port on a personal computer. In some embodiments, communications interface 570 is an integrated services digital network (ISDN) card or a digital subscriber line (DSL) card or a telephone modem that provides an information communication connection to a corresponding type of telephone line. In some embodiments, a communication interface 570 is a cable modem that converts signals on bus 510 into signals for a communication connection over a coaxial cable or into optical signals for a communication connection over a fiber optic cable. As another example, communications interface 570 may be a local area network (LAN) card to provide a data communication connection to a compatible LAN, such as Ethernet. Wireless links may also be implemented. For wireless links, the communications interface 570 sends or receives or both sends and receives electrical, acoustic or electromagnetic signals, including infrared and optical signals, that carry information streams, such as digital data. For example, in wireless handheld devices, such as mobile telephones like cell phones, the communications interface 570 includes a radio band electromagnetic transmitter and receiver called a radio transceiver. In certain embodiments, the communications interface 570 enables connection to the communication network 105 for providing social networking services to the UE 101.

The term computer-readable medium is used herein to refer to any medium that participates in providing information to processor 502, including instructions for execution. Such a medium may take many forms, including, but not limited to, non-volatile media, volatile media and transmission media. Non-volatile media include, for example, optical or magnetic disks, such as storage device 508. Volatile media include, for example, dynamic memory 504. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Figure 6:
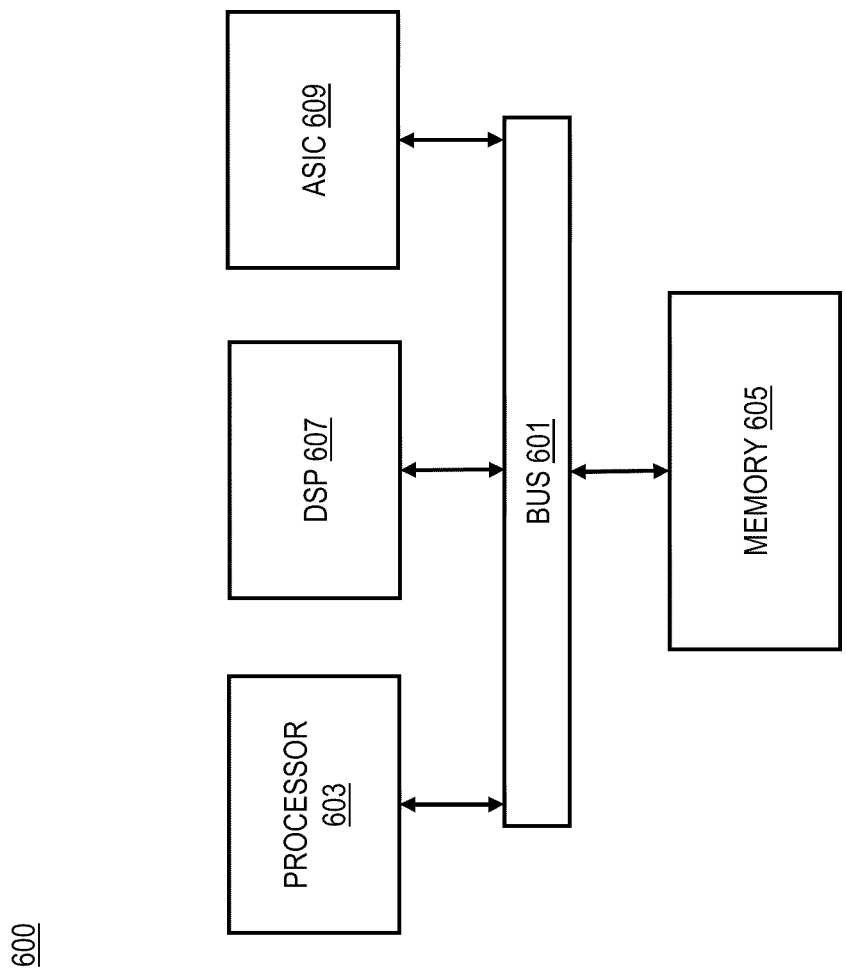
FIG. 6 is a diagram of a chip set that can be used to implement an embodiment of the invention.

FIG. 6 illustrates a chip set 600 upon which an embodiment of the invention may be implemented. Chip set 600 is programmed to determine social networking relationships based on media content as described herein and includes, for instance, the processor and memory components described with respect to FIG. 5 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 600 includes a communication mechanism such as a bus 601 for passing information among the components of the chip set 600. A processor 603 has connectivity to the bus 601 to execute instructions and process information stored in, for example, a memory 605. The processor 603 may include one or more processing cores with each core configured to perform independently. A multi-core processor enables multiprocessing within a single physical package. Examples of a multi-core processor include two, four, eight, or greater numbers of processing cores. Alternatively or in addition, the processor 603 may include one or more microprocessors configured in tandem via the bus 601 to enable independent execution of instructions, pipelining, and multithreading. The processor 603 may also be accompanied with one or more specialized components to perform certain processing functions and tasks such as one or more digital signal processors (DSP) 607, or one or more application-specific integrated circuits (ASIC) 609. A DSP 607 typically is configured to process real-world signals (e.g., sound) in real time independently of the processor 603. Similarly, an ASIC 609 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 603 and accompanying components have connectivity to the memory 605 via the bus 601. The memory 605 includes both dynamic memory (e.g., RAM, magnetic disk, writable optical disk, etc.) and static memory (e.g., ROM, CD-ROM, etc.) for storing executable instructions that when executed perform the inventive steps described herein to determine social networking relationships based on media content. The memory 605 also stores the data associated with, or generated by, the execution of the inventive steps.

Figure 7:
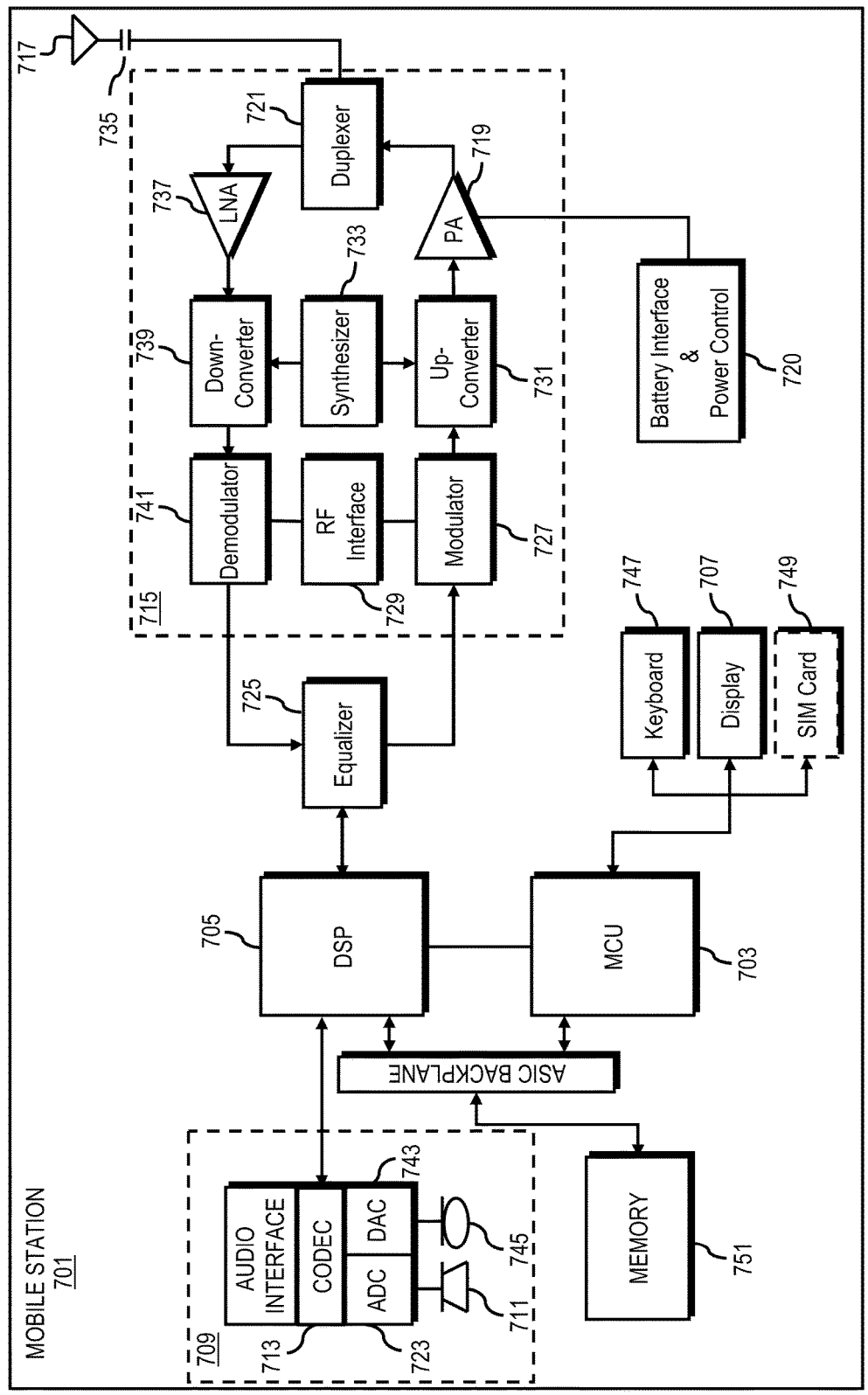
FIG. 7 is a diagram of a mobile station (e.g., handset) that can be used to implement an embodiment of the invention.

FIG. 7 is a diagram of exemplary components of a mobile station (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 703, a Digital Signal Processor (DSP) 705, and a receiver/transmitter unit including a microphone gain control unit and a speaker gain control unit. A main display unit 707 provides a display to the user in support of various applications and mobile station functions that offer automatic contact matching. An audio function circuitry 709 includes a microphone 711 and microphone amplifier that amplifies the speech signal output from the microphone 711. The amplified speech signal output from the microphone 711 is fed to a coder/decoder (CODEC) 713.

A radio section 715 amplifies power and converts frequency in order to communicate with a base station, which is included in a mobile communication system, via antenna 717. The power amplifier (PA) 719 and the transmitter/modulation circuitry are operationally responsive to the MCU 703, with an output from the PA 719 coupled to the duplexer 721 or circulator or antenna switch, as known in the art. The PA 719 also couples to a battery interface and power control unit 720.

In use, a user of mobile station 701 speaks into the microphone 711 and his or her voice along with any detected background noise is converted into an analog voltage. The analog voltage is then converted into a digital signal through the Analog to Digital Converter (ADC) 723. The control unit 703 routes the digital signal into the DSP 705 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 725 for compensation of any frequency-dependent impairments that occur during transmission though the air such as phase and amplitude distortion. After equalizing the bit stream, the modulator 727 combines the signal with a RF signal generated in the RF interface 729. The modulator 727 generates a sine wave by way of frequency or phase modulation. In order to prepare the signal for transmission, an up-converter 731 combines the sine wave output from the modulator 727 with another sine wave generated by a synthesizer 733 to achieve the desired frequency of transmission. The signal is then sent through a PA 719 to increase the signal to an appropriate power level. In practical systems, the PA 719 acts as a variable gain amplifier whose gain is controlled by the DSP 705 from information received from a network base station. The signal is then filtered within the duplexer 721 and optionally sent to an antenna coupler 735 to match impedances to provide maximum power transfer. Finally, the signal is transmitted via antenna 717 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 701 are received via antenna 717 and immediately amplified by a low noise amplifier (LNA) 737. A down-converter 739 lowers the carrier frequency while the demodulator 741 strips away the RF leaving only a digital bit stream. The signal then goes through the equalizer 725 and is processed by the DSP 705. A Digital to Analog Converter (DAC) 743 converts the signal and the resulting output is transmitted to the user through the speaker 745, all under control of a Main Control Unit (MCU) 703-which can be implemented as a Central Processing Unit (CPU) (not shown).

The MCU 703 receives various signals including input signals from the keyboard 747. The keyboard 747 and/or the MCU 703 in combination with other user input components (e.g., the microphone 711) comprise a user interface circuitry for managing user input. The MCU 703 runs a user interface software to facilitate user control of at least some functions of the mobile station 701 to determine social networking relationships based on media content. The MCU 703 also delivers a display command and a switch command to the display 707 and to the speech output switching controller, respectively. Further, the MCU 703 exchanges information with the DSP 705 and can access an optionally incorporated SIM card 749 and a memory 751. In addition, the MCU 703 executes various control functions required of the station. The DSP 705 may, depending upon the implementation, perform any of a variety of conventional digital processing functions on the voice signals. Additionally, DSP 705 determines the background noise level of the local environment from the signals detected by microphone 711 and sets the gain of microphone 711 to a level selected to compensate for the natural tendency of the user of the mobile station 701.

The CODEC 713 includes the ADC 723 and DAC 743. The memory 751 stores various data including call incoming tone data and is capable of storing other data including music data received via, e.g., the global Internet. The software module could reside in RAM memory, flash memory, registers, or any other form of writable storage medium known in the art. The memory device 751 may be, but not limited to, a single memory, CD, DVD, ROM, RAM, EEPROM, optical storage, or any other non-volatile storage medium capable of storing digital data.

An optionally incorporated SIM card 749 carries, for instance, important information, such as the cellular phone number, the carrier supplying service, subscription details, and security information. The SIM card 749 serves primarily to identify the mobile station 701 on a radio network. The card 749 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method for developing social networking relationships in a social network based on a media content and biometric data, the method comprising:
receiving a request from a user equipment of a user associated with the social network specifying a media content associated with one or more people;
initiating electronic processing of the media content to attempt to recognize the one or more people by extracting, utilizing at least one processor, biometric data of the one or more people represented in the media content using one or more computer algorithms configured to extract the biometric data,
wherein the extracted biometric data is associated with one or more intrinsic physical traits of the one or more people as represented in the media content;
comparing the extracted biometric data with other biometric data associated with one or more members of the social network to attempt to recognize the one or more people represented in the media content as being at least one of the one or more members of the social network;
determining whether the extracted biometric data and the other biometric data match within a predetermined error threshold,
wherein the determining is based on the comparing the one or more intrinsic physical traits represented in the biometric data of the one or more people and any corresponding physical traits represented in the other biometric data of the one or more members;
transmitting an option message for presentation at the user equipment configured to develop a social networking relationship based on the determining.

2. A method of claim 1, further comprising:
determining based on the biometric data that at least one of the one or more people has no member account of the social networking service;
receiving an address, a contact, or a combination thereof associated with at least one of the one or more people and/or a user device of the at least one of the one or more people;
initiating a transmission of a social networking invitation based on the address, the contact, or the combination thereof.

3. A method of claim 1, further comprising:
determining based on the biometric data that at least one of the one or more people has a member account of the social networking service;
retrieving at least one identification of the one of the one or more people based on the determining; and
initiating a presentation of the at least one identification and at least one option of transmitting a friend request to the one of the one or more people via the social networking service,
wherein the friend request is transmitted with a uniform resource locator of information of the one or more people.

4. A method of claim 3, wherein the one or more computer algorithms include one or more facial recognition algorithms, one or more fingerprint recognition algorithms, one or more iris recognition algorithms, one or more voice recognition algorithms, or a combination thereof, and
wherein the uniform resource locator includes a unique random token known only to the social networking service that supports registration with the social networking service, and the information of the one or more people include profile information, status, or a combination thereof associated with the social networking service.

5. A method of claim 1, wherein the one or more computer algorithms are selected from one or more fingerprint recognition algorithms, one or more iris recognition algorithms, one or more voice recognition algorithms, or a combination thereof.

6. A method of claim 1, wherein the media content includes audio data, a brainwave signature, a deoxyribonucleic acid pattern, or a combination thereof of the one or more people, and the one or more people are identified based, at least in part, on the audio data, the brainwave signature, the deoxyribonucleic acid pattern, or the combination thereof.

7. A method of claim 3, wherein the presentation of the option shows one or more indicia of a relationship between a first one of the one or more people and a second one of the one or more people, and the one or more indicia include information corresponding to relative strengths of relationships.

8. A method of claim 3, further comprising:
based on a privacy profile of the one of the one or more people, selectively including in the presentation: a list of service memberships of the one of the people, a number of common friends of the user and the one of the people, a list of the common friends, a number of pending social networking invitations sent to or received from the one of the people, or a combination thereof.

9. An apparatus for developing social networking relationships in a social network based on a media content and biometric data, the apparatus comprising:
at least one processor; and
at least one memory including computer program code,
the at least one memory and the computer program code configured to, with the at least one processor, cause the apparatus to perform at least the following,
receive a request from a user equipment of a user associated with the social network specifying a media content associated with one or more people;
initiate electronic processing of the media content to attempt to recognize the one or more people by extracting biometric data of the one or more people represented in the media content using one or more computer algorithms configured to extract the biometric data,
wherein the extracted biometric data is associated with one or more intrinsic physical traits of the one or more people as represented in the media content;
compare the extracted biometric data with other biometric data associated with one or more members of the social network to attempt to recognize the one or more people represented in the media content as being at least one of the one or more members of the social network;
determine whether the extracted biometric data and the other biometric data match within a predetermined error threshold,
wherein the determination is based on the comparison of the one or more intrinsic physical traits represented in the biometric data of the one or more people and any corresponding physical traits represented in the other biometric data of the one or more members;

transmit an option message for presentation at the user equipment configured to develop a social networking relationship based on the determining.

10. An apparatus of claim 9, wherein the apparatus is further configured to cause to generate the biometric data from the media content.

11. An apparatus of claim 10, wherein the apparatus is further configured to cause to:
determine based on the biometric data that at least one of the one or more people has no member account of the social networking service;
receive an address, a contact, or a combination thereof associated with at least one of the one or more people and/or a user device of the at least one of the one or more people;
initiate a transmission of a social networking invitation based on the address, the contact, or the combination thereof.

12. An apparatus of claim 11, wherein the apparatus is further caused to:
determine based on the biometric data that at least one of the one or more people has a member account of the social networking service;
retrieve at least one identification of the one of the one or more people based on the determination; and
initiate a presentation of the at least one identification and at least one option of transmitting a friend request to the one of the people via the social networking service.

13. An apparatus of claim 9, wherein the one or more computer algorithms are selected from one or more fingerprint recognition algorithms, one or more iris recognition algorithms, one or more voice recognition algorithms, or a combination thereof.

14. An apparatus of claim 9, wherein the media content includes audio data, a brainwave signature, a deoxyribonucleic acid pattern, or a combination thereof of the one or more people, and the one or more people are identified based, at least in part, on the audio data, the brainwave signature, the deoxyribonucleic acid pattern, or the combination thereof.

15. An apparatus of claim 12, wherein the presentation of the option shows one or more indicia of a relationship between a first one of the one or more people and a second one of the one or more people, and the one or more indicia include information corresponding to relative strengths of relationships.

16. A non-transitory computer-readable storage medium carrying one or more sequences of one or more instructions which, when executed by one or more processors, cause an apparatus to perform at least the following for developing social networking relationships in a social network based on a media content and biometric data:
receive a request from a user equipment of a user associated with the social network specifying a media content associated with one or more people;
initiate electronic processing of the media content to attempt to recognize the one or more people by extracting, utilizing at least one processor, biometric data of the one or more people represented in the media content using one or more computer algorithms configured to extract the biometric data,
wherein the extracted biometric data is associated with one or more intrinsic physical traits of the one or more people as represented in the media content;
compare the extracted biometric data with other biometric data associated with one or more members of the social network to attempt to recognize the one or more people represented in the media content as being at least one of the one or more members of the social network;
determine whether the extracted biometric data and the other biometric data match within a predetermined error threshold,
wherein the determination is based on the comparison of the one or more intrinsic physical traits represented in the biometric data of the one or more people and any corresponding physical traits represented in the other biometric data of the one or more members;
transmit an option message for presentation at the user equipment configured to develop a social networking relationship based on the determining.

17. A non-transitory computer-readable storage medium of claim 16, wherein the apparatus is further caused to generate the biometric data from the media content.

18. A non-transitory computer-readable storage medium of claim 17, wherein the apparatus is further caused to:
determine based on the biometric data that at least one of the one or more people has no member account of the social networking service;
receive an address, a contact, or a combination thereof associated with at least one of the one or more people and/or a user device of the at least one of the one or more people;
initiate a transmission of a social networking invitation based on the address, the contact, or the combination thereof.

19. A non-transitory computer-readable storage medium of claim 18, wherein the apparatus is further caused to:
determine based on the biometric data that at least one of the one or more people has a member account of the social networking service;
retrieve at least one identification of the one of the one or more people based on the determining; and
initiate a presentation of the at least one identification and at least one option of transmitting a friend request to the one of the one or more people via the social networking service,
wherein the friend request is transmitted with a uniform resource locator of information of the one or more people.

20. A non-transitory computer-readable storage medium of claim 16, wherein the one or more computer algorithms are selected from one or more fingerprint recognition algorithms, one or more iris recognition algorithms, one or more voice recognition algorithms, or a combination thereof.

* * * * *